Figure 1:
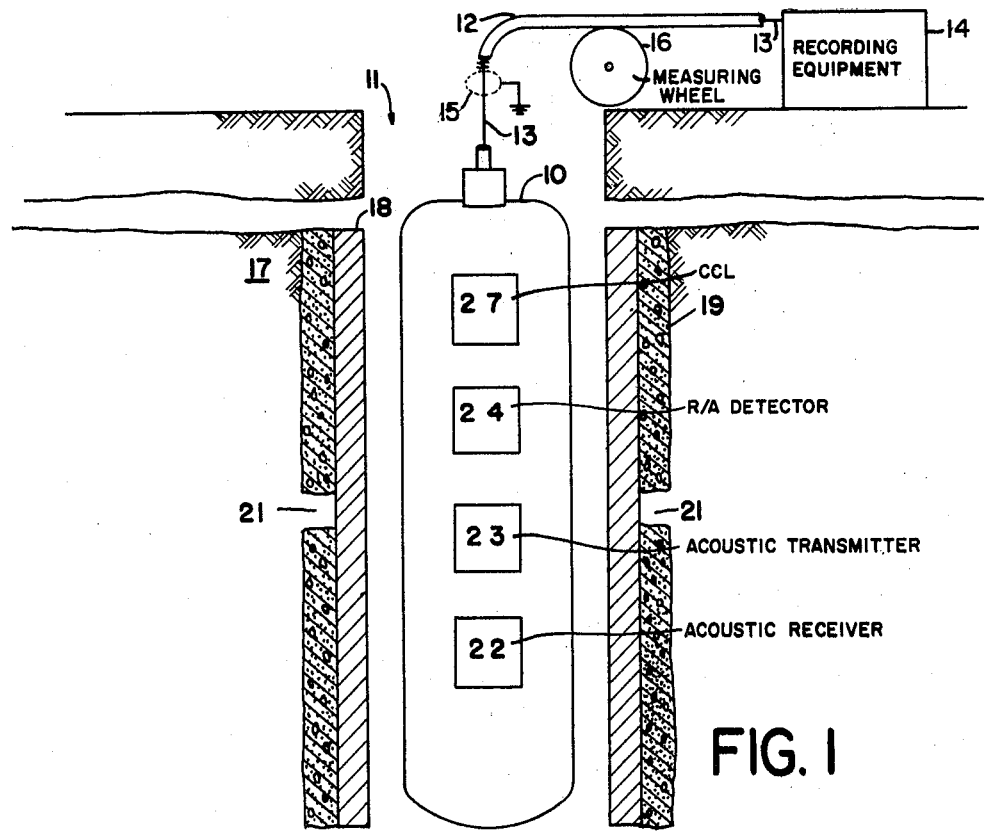

Dec. 7, 1965   J. C. WILSON   3,221,548
COMBINATION LOGGING SYSTEM AND METHOD
Filed June 2, 1961   4 Sheets-Sheet 1

INVENTOR.
JOHN C. WILSON
BY Robert W. Mayer
HIS ATTORNEY

INVENTOR.
JOHN C. WILSON
BY Robert W. Mayer
HIS ATTORNEY

Dec. 7, 1965    J. C. WILSON    3,221,548
COMBINATION LOGGING SYSTEM AND METHOD
Filed June 2, 1961    4 Sheets-Sheet 4

INVENTOR.
JOHN C. WILSON
BY Robert W. Mayer
HIS ATTORNEY

United States Patent Office 3,221,548
Patented Dec. 7, 1965

3,221,548
COMBINATION LOGGING SYSTEM
AND METHOD
John C. Wilson, Houston, Tex., assignor to Dresser Industries, Inc., Dallas, Tex., a corporation of Delaware
Filed June 2, 1961, Ser. No. 114,466
8 Claims. (Cl. 73—152)

This invention relates to well logging systems and methods and more particularly to a well logging system and method adapted to be operated in cased boreholes in conjunction with well completion equipment.

The completion of oil and gas wells involves the positioning of steel casing within the well bore and introduction of cement into the annular space between the well bore and the outside of the casing to permit selective production from a particular level or levels. In order to produce the well, the operator perforates the casing and the cement annulus, usually by exposives, at levels believed to be adjacent oil or gas bearing formations. The location of the zones of probable productivity is frequently determined before the setting of the casing by the running of an electric log, but it is usually desirable to correlate the electric log with a radioactivity log subsequent to the setting of the casing and prior to perforation. It is also desirable to perforate in those portions of the productive zone wherein a good bond has been formed between the casing and the surrounding cement sheath. This is because imperfections, such as the presence of voids or channels, in the cement sheath permits fluids from adjacent zones to flow into the perforations and mix with the desired fluids, or, in some cases, substantially inhibit their production. It is advantageous, therefore, to run a test of the effectiveness of the cement bond around the casing prior to perforation. Heretofore, such a log has involved the transmission of a voltage pulse or pulses of significant amplitude from the tool through a conductor to surface recording equipment. Because the amplitude of these pulses had to be measured accurately, special pains had to be taken to avoid interference by other pulses transmitted on the same conductor.

The running of radioactivity and cement bond logs prior to perforation of a well is fairly expensive because separate mobile units have heretofore been necessary for running the radioactivity and cement bond logs on one and the perforating equipment on the other. This is because perforating trucks are equipped with only a single insulated conductor sheathed cable used to support and actuate perforating equipment whereas combination logging equipment normally requires the use of a multi-conductor cable. When a multiconductor cable is used to transmit two different logging signals in pulse rate form, each signal transmitted over a different pair of conductors, special precautions must be taken to minimize induced pulses or "cross-talk" that distort the logging signals.

An object of this invention is to provide a method of simultaneously running two different types of logs using a tool supported by a sheathed cable containing but a single insulated electrical conductor.

Another object of this invention is to provide a combination logging tool for simultaneously conducting a radioactivity well survey within a cased borehole and continuously indicating the effectiveness of cement bonding around the casing.

A further object is to provide an economical, simple and highly flexible combination radioactivity and acoustic logging system including a sheathed cable containing but a single electrical conductor and thus operatable from a conventional perforating truck while at the same time easily adapted to obtain information on a variety of subsurface conditions.

Yet another object is to provide a combination logging system including a cable containing a single insulated conductor for supplying radioactivity and acoustic logs in such form that both signals may be continuously transmitted over a single insulated conductor without significant mutual interference.

In general, the foregoing objects are attained by providing a logging system which includes a logging tool adapted to be moved through a borehole, a sheathed cable containing a single insulated conductor supporting said tool and electrically connecting it to surface equipment and an acoustic cement bond logging section within the tool. The acoustic logging section is provided with means producing successive, time-spaced acoustic shock waves which pass along the casing and with an acoustic receiver for transmitting intelligence regarding the effectiveness of the cement bond. Such intelligence is indicated by the amplitude of one or more of the received shock waves and is transmitted in the form of a series of voltage pulses of given polarity with the frequency of the pulses providing an indication of the amplitude of the received acoustic wave. A radioactivity logging section is contained in the same tool and produces an output signal consisting of voltage pulses of polarity opposite from the pulses of the cement bond signal. Means responsive to the operation of the shock producing means is included in the tool for controlling response of the acoustic receiver to transmitted shock waves so that the electrical signal produced is characteristic of a particular factor under investigation, for example, the effectiveness of the cement bond around the casing.

By transmitting the acoustic logging signal in such form that the pulse rate, rather than pulse amplitude, is significant, it is possible to transmit the radioactivity logging signal on the same conductor as a pulse rate signal of opposite polarity without substantial distortion of either signal. This can be done without interrupting transmission of either logging signal because the measuring function in the case of both signals is that of counting a very large number of pulses. Even if an occasional positive pulse cancels out a negative pulse occurring at precisely the same instant, the distortion effect is very small because of the large number of pulses transmitted. On the other hand, if the acoustic log is transmitted as a relatively few pulses of significant amplitude, cancellation of even a few of them by radioactivity logging signal pulses of opposite polarity would distort the signal seriously.

The flexibility of the system of this invention is enhanced by the simplicity of the arrangement controlling the number of received acoustic shock waves measured as significant. As will be explained, the tool can be easily adjusted to measure effectiveness of cement bond to casing or to the formation or to measure properties of the formation itself.

Figure 3:
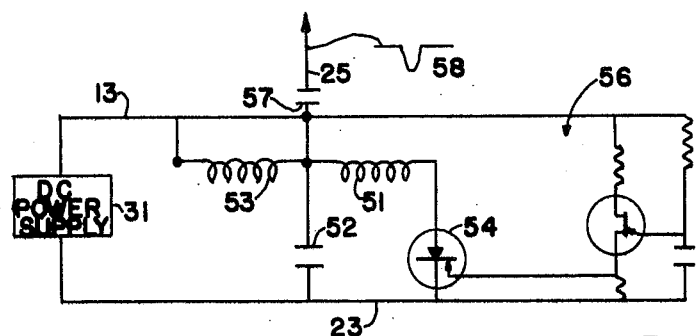
Figure 2:
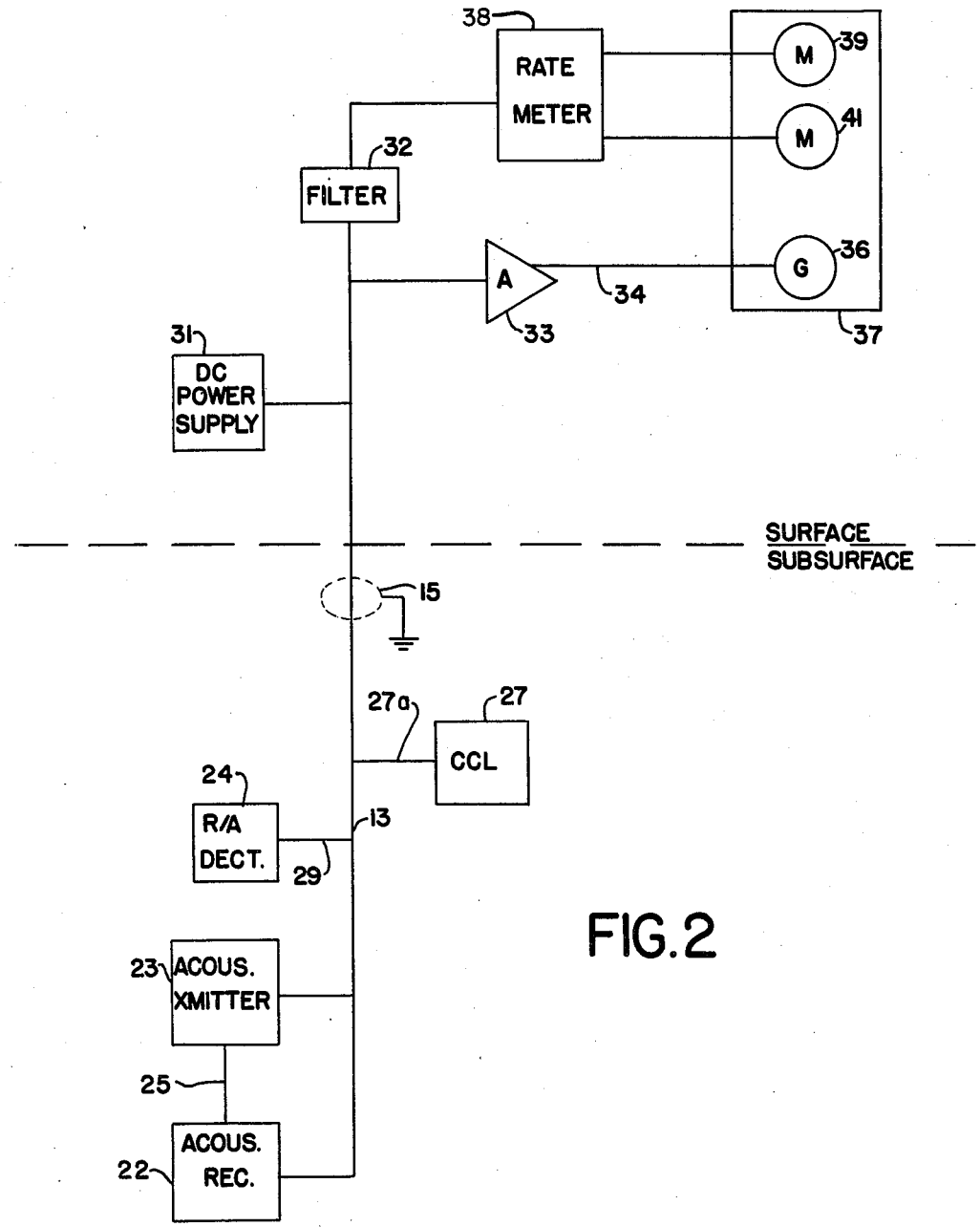
Figure 4:
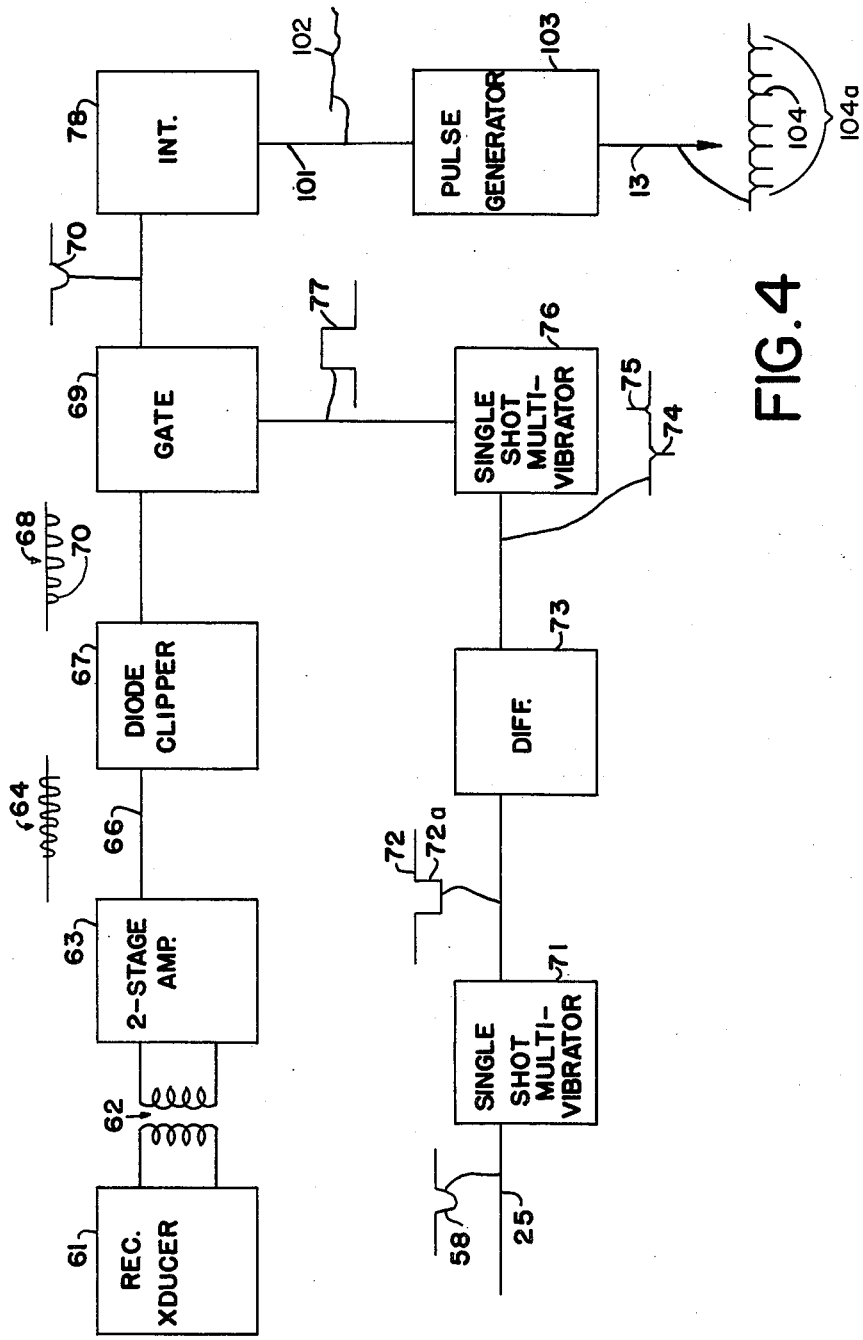
Figure 5:
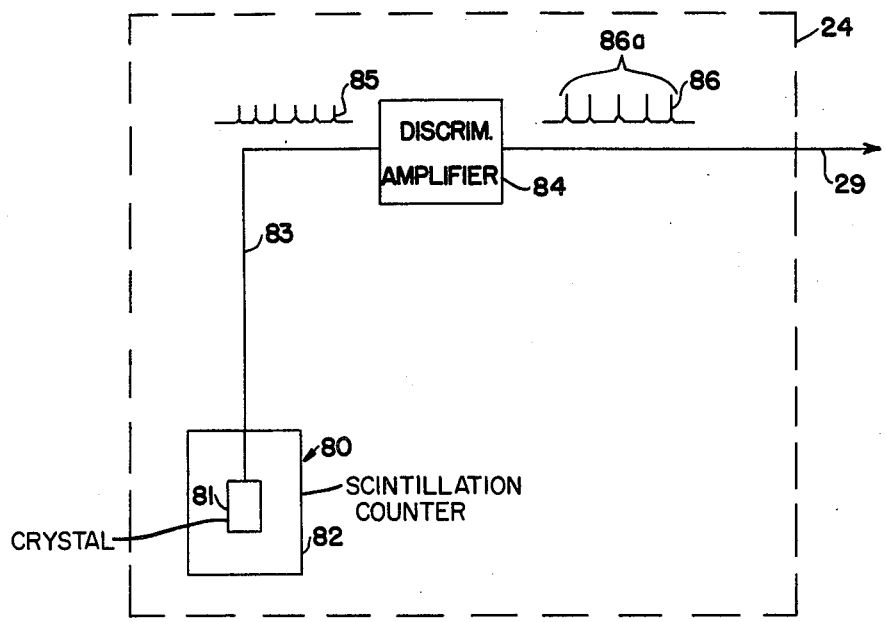
Figure 6:
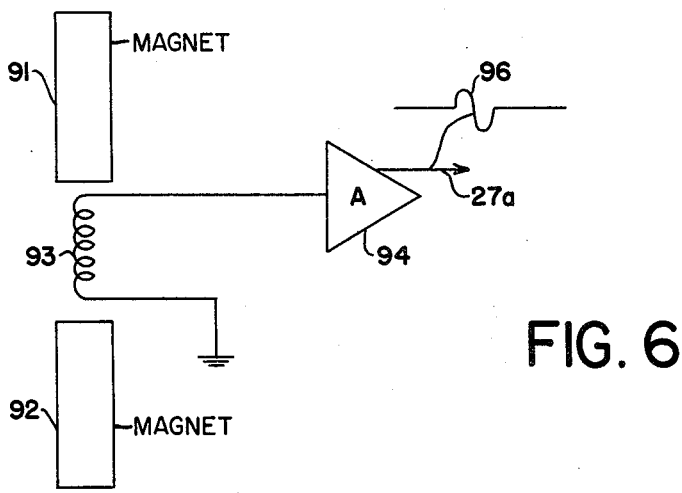

In the accompanying drawings:
FIG. 1 is a diagrammatic view showing a logging tool, embodying the system of the present invention, positioned within a cased well bore;
FIG. 2 is a block diagram illustrating the connection of the various elements of the subsurface and surface portions of the system;
FIG. 3 is a schematic circuit diagram of the acoustic transmitter included in the combination logging tool;
FIG. 4 is a block diagram of the acoustic receiver portion of the combination logging tool;
FIG. 5 is a block diagram illustrating the arrangement of the elements of the receiver portion of the radioactivity well logging section of the tool; and
FIG. 6 is a block diagram illustrating the arrangement of the various elements of the casing collar locator portion of the tool;

FIG. 1 illustrates an elongated, generally cylindrical logging tool 10 supported within the well bore 11 by cable 12. Cable 12 contains a single insulated electrical conductor 13 which provides electrical connection between the various parts of the tool 10 and the surface electronic equipment generally indicated at 14. The cable sheath or armor, indicated schematically at 15, serves as a return path for current in conductor 13. As is conventional in well logging, the tool 10 is moved through the borehole 11 by movement of the cable 12 which passes over the measuring wheel 16.

Borehole 11 traverses an earth formation indicated at 17 and has set therein a section of steel casing 18. An annular cement sheath 19 grips the outside of the casing, such sheath having been formed by pumping liquid cement into the annular space between the casing 18 and formation 17. Frequently, the cement will not fill the annular space perfectly and there will be formed various voids or channels, such as those indicated at 21. It is possible to detect the presence of these imperfections, by measuring the amplitude of a selected sound wave pulse or pulses transmitted through a section of the casing 18. The amplitude of vibration of casing 18, when subjected to an acoustic shock wave, is a function of the tightness with which it is held in place by the cement sheath 19, which, in turn, is affected by the presence or absence of voids such as 21. In conducting cement bond logging, a series of acoustic shock waves are emitted from a logging tool, transmitted through a section of adjacent casing and the amplitude of a selected acoustic shock wave is measured as received at a longitudinally spaced portion of the tool after having been transmitted through the casing. This measurement is transmitted electrically to equipment at the top of the borehole and is continuously recorded and correlated with the position of the tool in the well to produce a cement bond log.

In accordance with the embodiment of the invention illustrated, the tool 10 includes an acoustic receiver section 22, an acoustic transmitter section 23, a radioactivity detector section 24, and a magnetic casing collar locator 27. In accordance with the principles well known in the art, means (not shown) are provided for acoustically insulating acoustic transmitter 23 from acoustic receiver 22 so that acoustic shock waves will not be transmitted directly through the body of the tool from the former to the latter.

FIG. 2 illustrates, in block diagram form, the electrical connection of various surface and subsurface sections of the system. The subsurface elements, all of which are included in the tool 10 shown in FIG. 1, are connected to the single insulated conductor 13 of cable 12. Conductor 25 connects the electrical output of acoustic transmitter section 23 to acoustic receiver section 22.

The surface equipment of the system includes a conventional direct current power supply 31 which supplies direct current voltage to the various sections of the subsurface equipment through conductor 13. The remainder of the surface equipment separates and records the signals transmitted from subsurface sections of the system. It includes a high pass filter 32 which blocks out low frequency signals from the casing collar locator 27 and permits them to be passed selectively to the amplifier 33 and thence across conductor 34 to galvanometer 36 in the recorder 37. The mixture of high frequency radioactivity and cement bond log signals, which are of opposite polarity, are fed to the dual channel rate meter 38 and separately recorded on meters 39 and 41 of the recorder 37. All of the measurement made in recorder 37 are continuously correlated with the depth of the tool 10 to produce a continuous log, as is well known in the art.

Turning now to a more detailed description of the various sections of the downhole equipment, FIG. 3 is a schematic circuit diagram of the acoustic transmitter section 23. This includes a magnetostrictive transducer represented by the coil 51 which is periodically actuated by a high voltage pulse resulting from the discharge of capacitor 52. Capacitor 52 is connected in series with inductor 53 and both are connected through cable conductor 13 to surface direct current power supply 31. The capacitance of capacitor 52 and the inductance of inductor 53 are chosen with relation to the resistance of the circuit in which they appear to provide an oscillatory transient circuit when they are connected across the power supply 31. The silicon controlled rectifier 54, which serves as a switch and is periodically turned on by pulses received from the transistor oscillator circuit 56, permits the circuit branch including capacitors 52 and 53 to be periodically connected and disconnected across direct current power supply 31. Each connection produces a transient voltage overshoot across capacitor 52, i.e., the appearance of a voltage higher than that of power supply 31. The timing of oscillator 56 is chosen so that the pulses it emits turns silicon controlled rectifier 54 to its conductive state at times coinciding with the presence of such overshoot. An amplified voltage thus appears across capacitor 52 and discharges through coil 51, amplifying the power input to the transducer of which the coil is a part.

The operation of the circuit for supplying amplified voltage pulses to the transducer coil 51 is described in detail in the copending application of Norman J. Mellies entitled, "System for Producing Direct Current Voltage Pulses," Serial No. 92,399, filed February 28, 1961. The discharge of capacitor 52 produces a negative voltage pulse 58 in conductor 25 through capacitor 57. The occurrence of this trigger pulse 58 is thus substantially simultaneous with the production of each acoustic shock wave. The trigger pulse is transmitted through conductor 25 to the acoustic receiver section as will be explained subsequently. According to a preferred embodiment of the invention, acoustic shock waves and trigger pulses are transmitted at the rate of 50 per second.

The acoustic shock wave output of acoustic transmitter section 23 is transmitted from the tool 10 (FIG. 1), through the fluid (not shown) contained in borehole 11, into the casing 18, the cement sheath 19 and the formation 17. Vibrations transmitted through these various media are conducted to the receiver section 22 where they are picked up in the form of a complex acoustic shock wave train. As illustrated in FIG. 4, the acoustic receiver section 22 includes a receiver-transducer 61 which converts the acoustic energy received into an alternating current voltage signal transmitted through transformer 62 to the two-stage amplifier 63. Here it is amplified to an alternating current voltage wave train, indicated at 64, transmitted through conductor 66 to the diode clipper 67 which rectifies the signal and converts it to the form of a train of direct current voltage pulses as indicated at 68. This intermediate electric signal is the input to a conventional diode gate 69 the function of which is to permit passage of only the selected portion of wave train 68 indicative of the property being investigated. In the case of effectiveness of cement bonding, it has been found that the initial pulse 70 of wave train 68 is a measure of the amplitude of the acoustic shock wave transmitted directly through the casing 18 with later pulses in the wave train 68 being indicative of the amplitude of shock waves transmitted through the cement sheath 19 or the adjacent formation 17.

The opening, or turning to the conductive state, of gate 69 is controlled by the operation of acoustic transmitter 23. Negative trigger pulse 58 transmitted over conductor 25 forms the input to single shot multivibrator 71 which forms an output pulse indicated at wave form 72 which is of a predetermined width or duration. Pulse 72 is fed into the differentiating means 73 which produces a pair of spaced-apart voltage spikes 74 and 75 with the negative pulse 74 corresponding to the leading edge of pulse 72 and the positive pulse 75 corresponding to the trailing edge. It will be understood that pulses 72, 74 and 75 are shown as they would appear on an oscilloscope so that the trailing edge of pulse 72 is indicated at 72a. The lag between spikes 74 and 75 thus corresponds to the duration of pulse 72 which, in turn, is selected to correspond to the transmission time of an acoustic shock wave directly through the casing 18. Single shot multivibrator 76 is triggered by the arrival of positive pulse 75 and produces an output pulse 77 which serves to switch gate 69 to its conductive state for a predetermined period, i.e., the duration of pulse 77. Thus, the beginning of the conductive period of gate 69 is timed to coincide with the arrival of the significant acoustic pulse transmitted through the casing 18 at the receiver transducer 61 and with the transmission of the significant negative voltage pulse 70. Gate 69 remains conductive for a period sufficient to pass only the pulse 70 to the integrating circuit 78 and this period is determined by selecting the duration of pulse 77. Integrating circuit 78 produces an output through conductor 101 in the form of a direct current voltage. Wave form 102 illustrates that this voltage output changes to different levels as pulses 70 of different amplitudes are received. The integrating circuit 78 is typically a so-called diode pump but other known integrating circuits may be used that perform the function of producing a voltage output proportional to the average amplitude of the voltage pulses received. In the embodiment described only the initial pulse 70 is received by integrating circuit 78 so the voltage output of that circuit is proportional to the amplitude of such pulse. If several pulses in a wave train are received, the output of circuit 78 is proportional to their average amplitude.

The output of integrating circuit 78 is fed to pulse generator 103 which produces an output made up of a series of negative direct current voltage pulses 104, making up the acoustic logging signal 104a. The frequency of these pulses is proportional to the voltage output level from circuit 78 and hence to the amplitude of pulse 70. Pulse generator 103 may be any one of a number of known circuits that produce pulses at a rate proportional to a direct current voltage. For example, the multivibrator circuit shown on page 159 of the book "Basic Pulses" by I. Gottlieb, published by John F. Rider, Inc., may be adapted to this purpose or a pair of supressor grid coupled phantestron circuits may be employed.

FIG. 5 illustrates in block diagram form the radioactivity detector section 24 of the tool shown in FIG. 1. In the specific embodiment of the invention described, the detector section 24 contains a scintillation counter 80 made up of a scintillation crystal 81 and a container 82. The natural gamma radiation emitted from the adjacent earth formation and impinging on the crystal 81 (which is typically sodium iodide) produces a wave train of irregularly spaced positive voltage pulses 85 transmitted through conductor 83 to discriminator-amplifier 84. The discriminator-amplifier 84 is conventional in radioactivity logging and serves to amplify only those pulses transmitted through conductor 83 which are above a predetermined energy level. The output of discriminator-amplifier 84 in the form of amplified pulses 86 making up radioactivity logging signal 86a is fed to conductor 13 through conductor 29 and is combined with acoustic logging signal 104 from pulse generator 103 for transmission to the surface recording equipment.

The tool 10 illustrated in FIG. 1 also includes a conventional casing collar locator 27 illustrated schematically in FIG. 6. The locator illustrated in FIG. 1 also includes a conventional casing collar locator 27 illustrated schematically in FIG. 6. The locator illustrated includes a pair of longitudinally spaced-apart magnets 91 and 92 on either side of a coil 93 having one side connected to ground and the other to the input of an amplifier 94. As is well known, this type of casing collar locator operates by disturbance of the magnetic field associated with magnets 91 and 92. Each time the tool 10 is moved past a discontinuity in the casing string, such as that formed by a collar joint, disturbance of the field causes flux lines to cut coil 93. The voltage signal thus created is amplified through the amplifier 94 as a low frequency (about 2 cycle) voltage pulse 96 appearing on output conductor 27a. This is impressed on conductor 13 and transmitted to the surface with the radioactivity logging signal 86a and the acoustic logging signal 104a.

The combined logging and casing collar signals are transmitted through conductor 13 to the surface equipment. The high-pass filter 32 (FIG. 2) filters out the low frequency collar signals 96, which are amplified at amplifier 33, and the amplified signals transmitter through conductor 34 to the recording galvanometer 36 contained in the recording device 37. There they are continuously recorded and correlated with depth of the tool 10 to indicate the location of the casing collars. The radioactivity logging signal 86 and acoustic logging signal 104, both of much higher frequency than the collar signal, are passed by the filter 32 to the dual channel rate meter 38. This device seperately counts the rate of transmission of the positive pulses making up the radioactivity logging signal 86a and the negataive pulses making up the acoustic logging signal 104a and converts them to separate and independent signals recorded on the meters 39 and 41, respectively, of the recording device 37. These measurements are also continuously recorded and correlated with depth of the tool 10 to produce a continuous log as is well known in the art.

It will be understood that the pulse repetition rate in the radioactivity logging signal 86a will be in the order of a few thousand pulses per minute whereas the pulse repetition rate in the acoustic logging signal 104a may vary from a few hundred pulses per minute to about 5,000 pulses per minute. Thus, a very large total number of pulses of both polarities are transmitted during a survey with the combination tool 10, so that relatively few positive and negative pulses occur at the same instant to cancel one another out. The net effect of such cancellations on the accuracy of each signal is, therefore, very small. Using the pulse rate type of transmission for both the radioactivity and the acoustic logs has the advantage of permitting simultaneous, continuous and accurate transmission of both logging signals. In prior art systems where the acoustic logging signal is transmitted as a series of pulses of significant amplitude, it is necessary either to use separate conductors for the radioactivity and acoustic logging signals or to temporarily suspend transmission of the radioactivity logging signal during the intervals in which the acoustic logging pulses are transmitted. This is because where a relatively small number of pulses of significant amplitude are transmitted, the cancellation of even a relatively few of them will substantially distort the logging signal and produce erroneous information.

Although the present invention has been particularly described in connection with the obtaining of a log indicating the tightness of bonding between the cement sheath and the casing, it will be understood that one of the advantages of the invention is that it can be adapted to making other kinds of acoustic logs such as those giving information regarding the nature of the traversed formation or of the efficiency of the bonding of the cement sheath to the formation itself by simply adjusting the period during which the gate 69 (FIG. 4) remains open so that the output of integrating circuit 78 is proportional to the average amplitude of several pulses of wave train 68. This is done by adjusting the width of the pulse 77 produced by single shot multivibrator 76. Thus, if it is desired to obtain information which is indicated by the average amplitude of, for example, the first four pulses of the intermediate electrical signal 68, multivibrator 76 is adjusted to produce a pulse 77 of sufficient duration to hold gate 69 open for the necessary length of time. If it is desired to obtain information indicated by the average amplitude of only intermedate pulses of wave train 68, this can be accomplished by adjusting multivibrator 71 to produce a wider pulse 72. This delays the opening of gate 69 until the arrival at receiver section 22 of the acoustic shock waves corresponding to later arriving pulses in wave train 68. Thus, the system of this invention may easily be adapted to obtain a log indicative of the bond between the cement sheath and the formation or a log indicative of the formation characteristics itself.

Although the present invention has been described in terms of a specific embodiment thereof including particular radioactivity logging means as well as conventional casing collar locator, gating means and pulse generators, it will be understood that other types of radioactivity logging means, including those comprising a separate radiation source, other types of acoustic logging means and equivalent electronic circuitry to perform the same functions as performed by the means disclosed may be substituted therefor without departing from the spirit of the invention as defined in the following claims.

I claim:

1. A logging system for use in a cased borehole in which the casing is at least partially surrounded by a cement sheath, said system comprising:
   a logging tool adapted to be moved through said borehole;
   a sheathed cable supporting said tool;
   a single insulated electrical conductor in said cable;
   surface equipment, including signal receiving means and a direct current supply, electrically connected to said conductor;
   an electrically actuated acoustic shock wave transmitter in said tool, said transmitter electrically connected to said conductor and adapted to produce acoustic shock waves for transmission axially of said borehole;
   an acoustic shock wave receiver in said tool spaced from said transmitter including means for converting received acoustic energy into an intermediate electrical signal made up of a series of pulses of varying amplitude;
   integrating means electrically connected to said receiver in said tool for producing a direct current voltage output of magnitude proportional to the amplitude of pulses of said intermediate signal received by said integrating means;
   a pulse generator electrically connected to the output of said integrating means for producing an acoustic logging as a series of direct current voltage pulses of one polarity and of a frequency proportional to said voltage output of said integrating means;
   means electrically connecting the output of said pulse generator to said conductor;
   radioactivity detector means in said tool for receiving radiation from earth formations traversed by said borehole, said radioactivity detector means effective to convert said received radiation into a radioactivity logging signal made up of a series of direct current voltage pulses of polarity opposite that of said acoustic logging signal;
   means electrically connecting the electrical output of said radioactivity detector means to said conductor;
   gating means electrically connected to said integrating means and effective to permit reception of only selected pulses of said intermediate signal by said integrating means; and
   means electrically interconnected with said shock wave transmitter and said gating means and actuated by said shock wave transmitter to actuate said gating means.

2. A logging system for use in a cased borehole in which the casing is at least partially surrounded by a cement sheath, said system comprising:
   a logging tool adapted to be moved through said borehole;
   a sheathed cable supporting said tool;
   a single insulated electrical conductor in said cable;
   surface equipment, including signal receiving means and a direct current power supply, electrically connected to said conductor;
   an electrically actuated acoustic shock wave transmitter in said tool, said transmitter electrically connected to said conductor and adapted to produce acoustic shock waves for transmission axially of said borehole;
   an acoustic shock wave receiver in said tool spaced from said transmitter including means for converting received acoustic energy into an intermediate electrical signal made up of a series of pulses of varying amplitude with the amplitude of the initial pulse of said series indicative of the tightness of bonding of said cement sheath to said casing;
   integrating means electrically connected to said receiver in said tool for producing a direct current voltage output of magnitude proportional to the amplitude of said initial pulse;
   a pulse generator electrically connected to the output of said integrating means for producing an acoustic logging signal as a series of direct current voltage pulses of one polarity and of a frequency proportional to said voltage output of said integrating means;
   means electrically connecting the output of said pulse generator to said conductor;
   radioactivity detector means in said tool for receiving radiation from earth formations traversed by said borehole, said radioactivity detector means effective to convert said received radiation into a radioactivity logging signal made up of a series of direct current voltage pulses of polarity opposite that of said acoustic logging signal;
   means electrically connecting the electrical output of said radioactivity detector means to said conductor;
   gating means electrically connected to said integrating means and effective to permit reception of only said initial pulse of said intermediate signal by said integrating means; and
   means electrically interconnected with said shock wave transmitter and said gating means and actuated by said shock wave transmitter to actuate said gating means.

3. A method of simultaneously making an acoustic log and a radioactivity log in which a logging tool moved through a borehole is supported on a sheathed cable containing a single insulated conductor, such method comprising:
   periodically transmitting acoustic shock waves axially of said borehole;
   detecting radiation emitted from formations adjacent said tool, and producing a radioactivity logging signal made up of direct current voltage pulses of a selected polarity, the frequency of said pulses being a measure of said radiation;
   transmitting said radioactivity logging signal through said conductor;
   receiving said acoustic shock waves transmitted axially of said borehole;
   converting said shock waves to an intermediate electrical signal made up of a series of pulses of varying amplitude;
   converting said intermediate signal to an acoustic logging signal made up of direct current voltage pulses of polarity opposite that of said radioactivity logging signal and of a frequency proportional to the average amplitude of a selected portion of said intermediate signal; and
   transmitting said acoustic logging signal through said conductor simultaneously with said radioactivity logging signal.

4. The method according to claim 3 wherein said selected portion is the initial pulse of said intermediate signal.

5. A method of simultaneously making an acoustic cement bond log and a radioactivity log in which a logging tool moved through a cased borehole is supported on a sheathed cable containing a single insulated conductor and in which the casing in the borehole is at least partially surrounded by cement, such method comprising:

periodically producing and transmitting acoustic shock waves axially of said borehole;

continuously detecting radiation emitted from formations adjacent said tool, and continuously producing a radioactivity logging signal made up of direct current voltage pulses of a selected polarity, the frequency of said pulses being a measure of said radiation;

transmitting said radioactivity logging signal through said conductor;

receiving said acoustic shock waves transmitted axially of said borehole;

converting said shock waves to an intermediate electrical signal made up of a series of pulses of varying amplitude;

converting a selected portion of said intermediate signal to a direct current voltage actuating signal having an amplitude proportional to the average amplitude of the pulses of said selected portion of said intermediate signal;

actuating a pulse generator with said actuating signal to produce an acoustic logging signal made up of direct current voltage pulses of polarity opposite that of said radioactivity logging signal and of a frequency proportional to the amplitude of said actuating signal; and transmitting said acoustic logging signal through said conductor simultaneously with said radioactivity logging signal.

6. The method according to claim 5 wherein said selected portion of said intermediate signal is the initial pulse thereof.

7. A well logging system comprising a subsurface logging instrument, surface recording equipment, and a sheathed cable interconnecting said instrument and said recording equipment;

said instrument including in combination;

a radiation detector providing electrical pulses of a first polarity in response to incident radiations;

an acoustic energy transmitter producing an acoustic impulse;

an acoustic energy receiver for receiving said acoustic impulse and in response thereto developing an electrical data pulse having an amplitude which is characteristic of the amplitude of a preselected initial portion of said received acoustic impulse; and conversion means connected to said acoustic energy receiver for receiving said electrical data pulse and in response thereto producing index pulses of a second polarity at a frequency functionally related to the amplitude of said electrical data pulse;

said cable including one conductor connecting said radiation detector and said conversion means to said surface recording equipment; and said surface recording equipment including means responsive to the frequency of said index pulses for indicating the amplitude of said portion of said received acoustic impulse.

8. A well logging system comprising a subsurface logging instrument, surface recording equipment, and a shielded cable interconnecting said instrument and said recording equipment; said instrument including in combination;

a radiation detector providing in response to incident radiations electrical pulses of a first polarity;

an acoustic energy transmitter for producing an acoustic energy impulse;

an acoustic energy receiver for receiving said acoustic energy impulse and in response thereto developing an electric data pulse functionally related in amplitude to a preselected characteristic of a preselected portion of said received acoustic energy impulse; and conversion means connected to said acoustic energy receiver for receiving said data pulse and in response thereto producing index pulses of a second polarity at a frequency functionally related to said preselected characteristic;

said cable including one conductor connecting said radiation detector and said conversion means to said surface recording means; and said surface recording equipment including means responsive to said index pulses for indicating said preselected characteristic of said portion of said received acoustic impulse.

References Cited by the Examiner

UNITED STATES PATENTS

| | | | |
|---|---|---|---|
| 2,412,575 | 12/1946 | Frosch | 73—152 |
| 2,450,265 | 9/1948 | Wolf | 73—152 X |
| 2,573,137 | 10/1951 | Greer | 340—18 X |
| 2,604,181 | 7/1952 | Basham et al. | 181—.5 |
| 2,691,422 | 10/1954 | Summers et al. | 181—53 |
| 2,750,796 | 6/1956 | Knoll et al. | 73—152 |
| 2,849,075 | 8/1958 | Godbey | 340—18 |
| 2,942,112 | 6/1960 | Hearn | 340—18 |
| 2,974,303 | 3/1961 | Dixon | 73—152 X |
| 3,050,151 | 8/1962 | Vogel | 181—.5 |

RICHARD C. QUEISSER, *Primary Examiner.*

ROBERT L. EVANS, JOSEPH P. STRIZAK,
*Examiners.*

---

Notice of Adverse Decision in Interference

In Interference No. 95,879 involving Patent No. 3,221,548, J. C. Wilson, COMBINATION LOGGING SYSTEM AND METHOD, final judgment adverse to the patentee was rendered Mar. 14, 1969, as to claims 1, 2, 3, 4, 5, 6, 7 and 8.

[*Official Gazette May 6, 1969.*]

Notice of Adverse Decision in Interference

In Interference No. 95,879 involving Patent No. 3,221,548, J. C. Wilson, COMBINATION LOGGING SYSTEM AND METHOD, final judgment adverse to the patentee was rendered Mar. 14, 1969, as to claims 1, 2, 3, 4, 5, 6, 7 and 8.

[*Official Gazette May 6, 1969.*]